US012626156B2

(12) United States Patent
Shmelkin et al.

(10) Patent No.: US 12,626,156 B2
(45) Date of Patent: May 12, 2026

(54) DATA MARK CLASSIFICATION TO VERIFY DATA REMOVAL

(71) Applicant: INTERNATIONAL BUSINESS MACHINES CORPORATION, Armonk, NY (US)

(72) Inventors: Ron Shmelkin, Haifa (IL); Abigail Goldsteen, Haifa (IL); Gilad Ezov, Nesher (IL); Ariel Farkash, Shimshit (IL)

(73) Assignee: International Business Machines Corporation, Armonk, NY (US)

( * ) Notice: Subject to any disclaimer, the term of this patent is extended or adjusted under 35 U.S.C. 154(b) by 1452 days.

(21) Appl. No.: 17/208,498

(22) Filed: Mar. 22, 2021

(65) Prior Publication Data

US 2022/0300837 A1    Sep. 22, 2022

(51) Int. Cl.
*G06N 5/04*      (2023.01)
*G06N 20/00*     (2019.01)

(52) U.S. Cl.
CPC .............. *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS

| | | | |
|---|---|---|---|
| 10,225,277 B1 * | 3/2019 | Shintre | ............... G06F 21/6254 |
| 2019/0050367 A1 * | 2/2019 | Saur | ...................... H04L 9/0637 |
| 2019/0332800 A1 | 10/2019 | Veeraragavan | |

OTHER PUBLICATIONS

Lallich, Stéphane, Fabrice Muhlenbach, and Djamel A. Zighed. "Improving classification by removing or relabeling mislabeled instances." International Symposium on Methodologies for Intelligent Systems. Berlin, Heidelberg: Springer Berlin Heidelberg, 2002. (Year: 2002).*

Golatkar, Aditya, et al. "Mixed-privacy forgetting in deep networks." Proceedings of the IEEE/CVF conference on computer vision and pattern recognition. 2020. (Year: 2020).*

Kim, Wansoo, and Kyogu Lee. "Digital watermarking for protecting audio classification datasets." ICASSP 2020-2020 IEEE International Conference on Acoustics, Speech and Signal Processing (ICASSP). IEEE, 2020. (Year: 2020).*

(Continued)

*Primary Examiner* — Michael H Hoang
(74) *Attorney, Agent, or Firm* — Caleb D. Wilkes

(57)          ABSTRACT

A method, computer system, and a computer program product for testing a data removal are provided. Data elements are marked with a respective mark per represented entity. The marked data elements, with labels indicating the respective marks, are input into a machine learning model to form a trained machine learning model. The trained machine learning model is configured to perform a dual task that includes a main task and a secondary task that includes a classification based on the labels. A forgetting mechanism is applied to the trained machine learning model to remove a data element including a test mark of the marked data elements. A test data element marked with the test mark is input into the revised machine learning model. The classification of the secondary task of an output of the revised machine learning model is determined for the input test data element.

20 Claims, 8 Drawing Sheets

(56) References Cited

OTHER PUBLICATIONS

Yang, Ziqi, Hung Dang, and Ee-Chien Chang. "Effectiveness of distillation attack and countermeasure on neural network watermarking." arXiv preprint arXiv:1906.06046 (2019). https://arxiv.org/pdf/1906.06046 (Year: 2019).*

Guo, Shangwei, et al. "The hidden vulnerability of watermarking for deep neural networks." arXiv preprint arXiv:2009.08697 3 (2020). https://arxiv.org/pdf/2009.08697v1 (Year: 2020).*

Chen, Xinyun, et al. "REFIT: A Unified Watermark Removal Framework For Deep Learning Systems With Limited Data." arXiv preprint arXiv: 1911.07205 (2019). https://arxiv.org/pdf/2009.08697v1 (Year: 2019).*

Sommer, David Marco, et al. "Towards probabilistic verification of machine unlearning." arXiv preprint arXiv:2003.04247 (2020). https://arxiv.org/pdf/2003.04247 (Year: 2020).*

Chen et al., "When Machine Unlearning Jeopardizes Privacy," arXiv:2005.02205v1 [cs.CR] May 5, 2020, Retrieved from the Internet: <https://arxiv.org/pdf/2005.02205v1.pdf>, 18 pages.

Farokhi et al., "Modelling and Quantifying Membership Information Leakage in Machine Learning," arXiv:2001.10648v2 [cs.LG] Apr. 28, 2020, Retrieved from the Internet: <https://arxiv.org/abs/2001.10648>, 13 pages.

Garg et al., "Formalizing Data Deletion in the Context of the Right to be Forgotten," arXiv:2002.10635v1 [cs.CR] Feb. 25, 2020, Retrieved from the Internet: <https://arxiv.org/pdf/2002.10635v1.pdf>, 36 pages.

Ginart et al., "Making AI Forget You: Data Deletion in Machine Learning," arXiv:1907.05012v2 [cs.LG] Nov. 4, 2019, Retrieved from the Internet: <https://arxiv.org/pdf/1907.05012.pdf>, 28 pages.

Github, "DWT-DCT-Digital-Image-Watermarking," [accessed Dec. 10, 2020], Retrieved from the Internet: <https://github.com/diptamath/DWT-DCT-Digital-Image-Watermarking>, 2 pages.

Golatkar et al., "Eternal Sunshine of the Spotless Net: Selective Forgetting in Deep Networks," arXiv:1911.04933v5 [cs.LG] Mar. 31, 2020, Retrieved from the Internet: <https://arxiv.org/abs/1911.04933>, 14 pages.

Guo et al., "Certified Data Removal from Machine Learning Models," Proceedings of the 37th International Conference on Machine Learning, Online, PMLR 119, 2020, arXiv:1911.03030v5 [cs.LG] Aug. 14, 2020, Retrieved from the Internet: <https://arxiv.org/abs/1911.03030>, 14 pages.

Mell, et al., "The NIST Definition of Cloud Computing", National Institute of Standards and Technology, Special Publication 800-145, Sep. 2011, 7 pages.

Sablayrolles et al., "Radioactive data: tracing through training," arXiv:2002.00937v1 [stat.ML] Feb. 3, 2020, Retrieved from the Internet: <https://arxiv.org/pdf/2002.00937v1.pdf>, 11 pages.

Sommer et al., "Towards Probabilistic Verification of Machine Unlearning," arXiv:2003.04247v2 [cs.CR] Dec. 1, 2020, Retrieved from the Internet: <https://arxiv.org/pdf/2003.04247.pdf>, 21 Pages.

Graves et al., "Amnesiac Machine Learning," arXiv:2010.10981v1 [cs.LG] Oct. 21, 2020, Association for the Advancement of Artificial Intelligence, Retrieved from the Internet: <https://arxiv.org/pdf/2010.10981.pdf>, 9 pages.

Izzo et al., "Approximate Data Deletion from Machine Learning Models," arXiv:2002.10077v2 [cs.LG] Feb. 23, 2021, International Conference on Artificial Intelligence and Statistics (AISTATS), Retrieved from the Internet: <https://arxiv.org/pdf/2002.10077.pdf>, 20 pages.

Long et al., "Towards Measuring Membership Privacy," arXiv:1712.09136v1 [cs.CR] Dec. 25, 2017, Retrieved from the Internet: <https://arxiv.org/pdf/1712.09136.pdf>, 18 pages.

Shokri et al., "Membership Inference Attacks Against Machine Learning Models," arXiv:1610.05820v2 [cs.CR] Mar. 31, 2017, Retrieved from the Internet <https://arxiv.org/pdf/1610.05820.pdf>, 16 pages.

Bourtoule et al., "Machine Unlearning," arXiv:1912.03817v3 [cs.CR] Dec. 15, 2020, 42nd IEEE Symposium of Security and Privacy, Retrieved from the Internet: <https://arxiv.org/pdf/1912.03817.pdf>, 19 pages.

Caruana, "Multitask Learning," Machine Learning, vol. 28, pp. 41-75, (1997), Kluwer Academic Publishers, Netherlands.

Faddoul et al., "Learning Multiple Tasks with Boosted Decision Trees," ECML PKDD 2012—Joint European Conference on Machine Learning and Knowledge Discovery in Databases, Part I, LNCS 7523, pp. 681-696, Springer-Verlag Berlin Heidelberg.

* cited by examiner

100

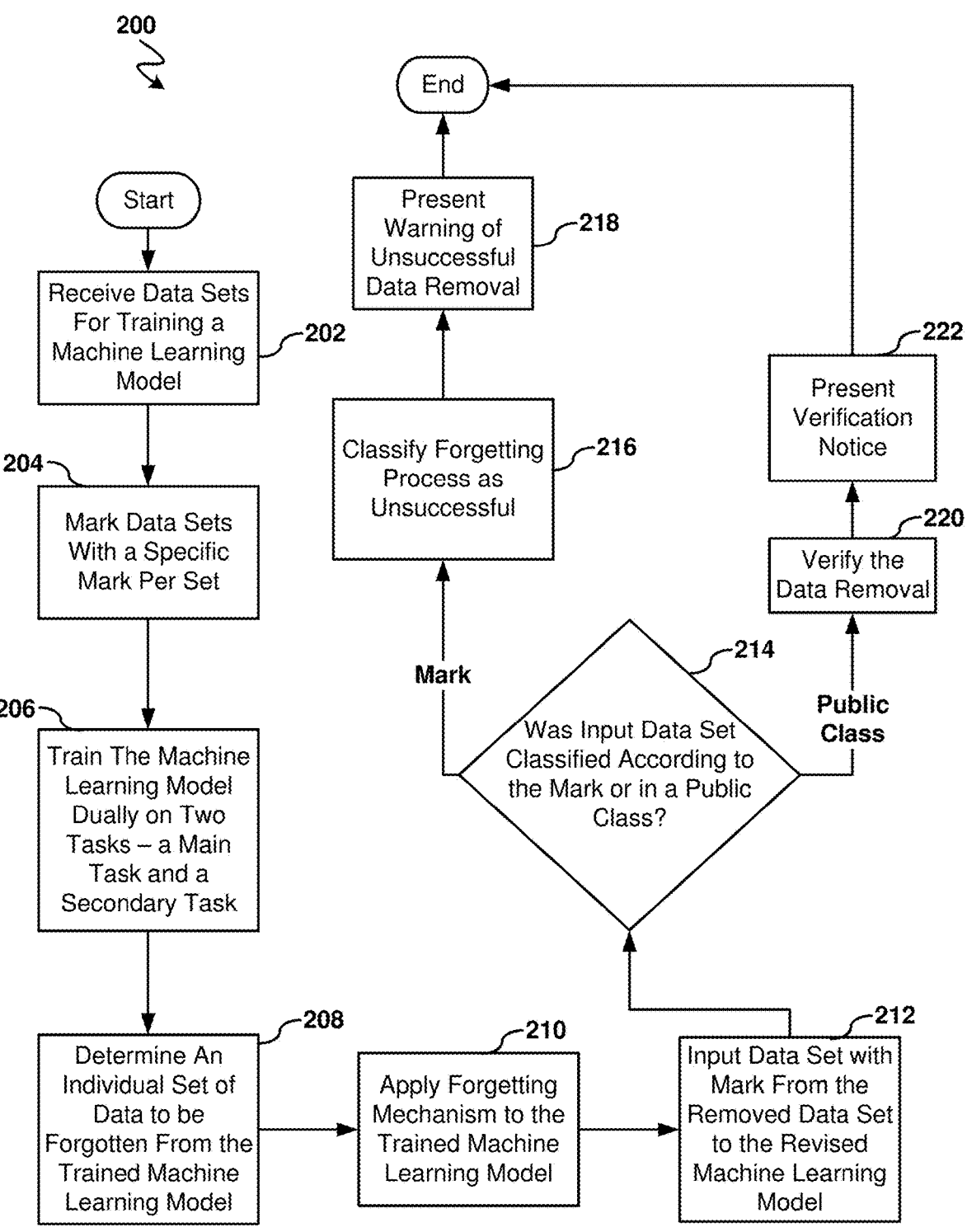

200

Start

Receive Data Sets For Training a Machine Learning Model ⎯202

204⎯ Mark Data Sets With a Specific Mark Per Set

206⎯ Train The Machine Learning Model Dually on Two Tasks – a Main Task and a Secondary Task 208⎯ Determine An Individual Set of Data to be Forgotten From the Trained Machine Learning Model 210⎯ Apply Forgetting Mechanism to the Trained Machine Learning Model 212⎯ Input Data Set with Mark From the Removed Data Set to the Revised Machine Learning Model 214⎯ Was Input Data Set Classified According to the Mark or in a Public Class?

Mark

216⎯ Classify Forgetting Process as Unsuccessful

218⎯ Present Warning of Unsuccessful Data Removal

Public Class

220⎯ Verify the Data Removal

222⎯ Present Verification Notice

End

DATA MARK CLASSIFICATION TO VERIFY DATA REMOVAL

BACKGROUND

The present invention relates generally to the field of 'right to be forgotten' requests and more particularly to computerized evaluation of fulfilling such right-to-be-forgotten requests in artificial intelligence.

SUMMARY

According to one exemplary embodiment, a method for testing a data removal is provided. Data elements are marked with a respective mark per represented entity. The marked data elements, with labels indicating the respective marks, are input into a machine learning model to form a trained machine learning model. The trained machine learning model is configured to perform a dual task that includes a main task and a secondary task. The secondary task includes a classification based on the labels. A forgetting mechanism is applied to the trained machine learning model to remove a data element including a test mark of the marked data elements and so that a revised machine learning model is formed. A test data element marked with the test mark is input into the revised machine learning model. The classification of the secondary task of an output of the revised machine learning model is determined for the input test data element. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is an operational flowchart illustrating a process for data removal testing according to at least one embodiment;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for data removal testing as it relates to machine learning models. The present embodiments have the capacity to improve the technical field of removing data from trained machine learning models, for example when a request for forgetting is directed to the machine learning model. A right to be forgotten is established in many jurisdictions. Trained machine learning models may contain personal data. Therefore, owners of artificial intelligence and machine learning models that have used some consumer data to train their models will need to correct their model in response to receiving a request to be forgotten. The present disclosure may help evaluate the effectiveness of forgetting mechanisms that may be applied to trained machine learning models to help the models forget certain data. This forgetting may also be referred to as data removal. The present disclosure may help model owners to rate the effectiveness of various forgetting mechanisms so that they can better choose which forgetting mechanism to permanently implement for their system and model. The present disclosure may also help a model owner prove to a consumer that they have sufficiently responded to a request that the consumer makes requesting to be forgotten. The present disclosure may be applied with white box knowledge of the machine learning model and is not dependent on model overfitting for success.

Figure 1:
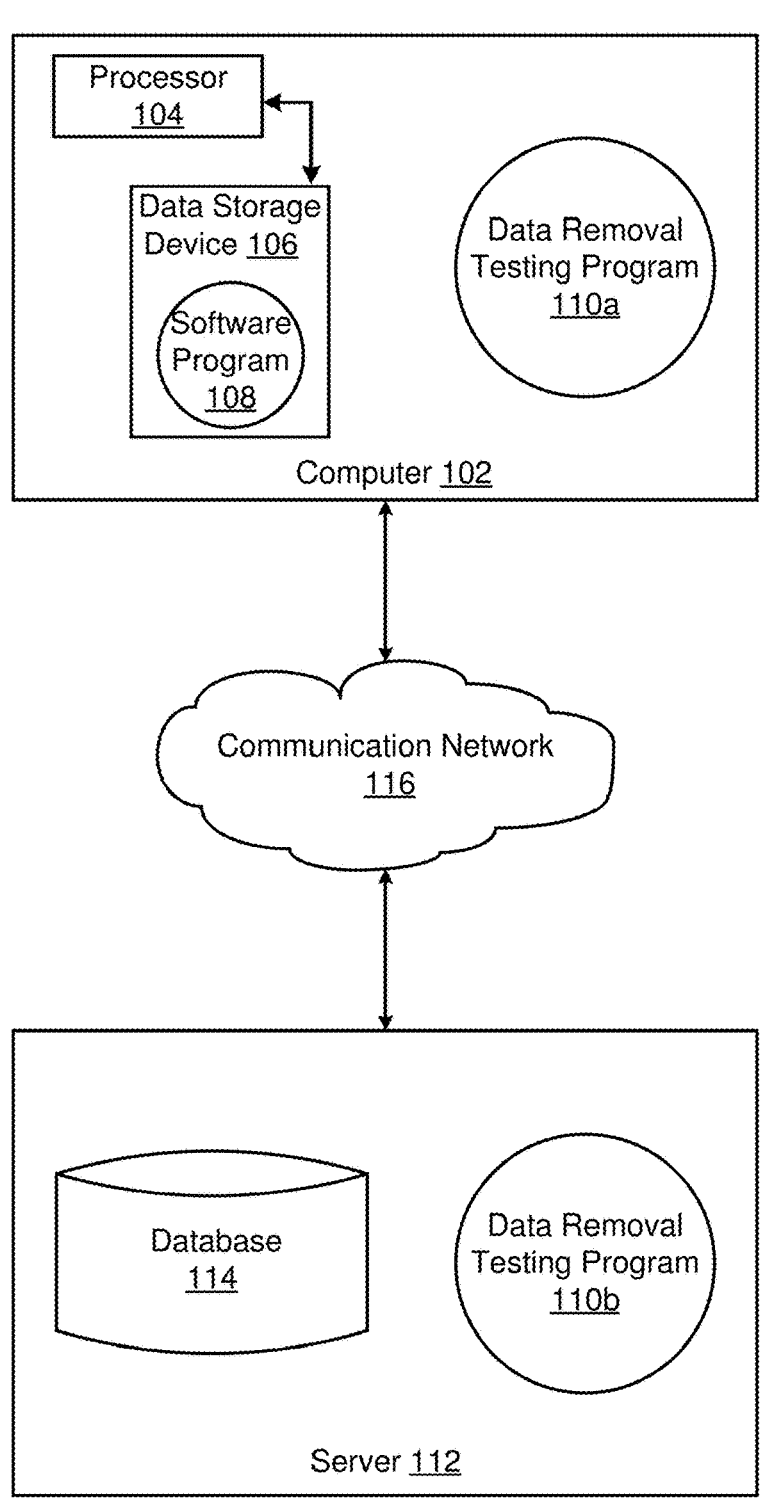
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data removal testing program 110a. The networked computer environment 100 may also include a server 112 that is a computer and that is enabled to run a data removal testing program 110b that may interact with a database 114 and a communication network 116. The networked computer environment 100 may include a plurality of computers 102 and servers 112, although only one computer 102 and one server 112 are shown in FIG. 1. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communication network 116. The communication network 116 may include connections, such as wire, wireless communication links, or fiber optic cables. As will be discussed with reference to FIG. 6, server 112 may include internal components 602a and external components 604a, respectively, and client computer 102 may include internal components 602*b* and external components 604*b,* respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. According to various implementations of the present embodiment, the data removal testing program 110*a,* 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the data removal testing program 110*a,* 110*b* to evaluate how well data has been removed from a trained machine learning model. A first data removal testing process 200 is explained in more detail below with respect to FIGS. 2 and 3. A second data removal testing process 400 that may be performed by the data removal testing program 110*a,* 110*b* is explained in more detail below with respect to FIGS. 4 and 5.

Referring now to FIG. 2, an operational flowchart depicts a first data removal testing process 200 that may, according to at least one embodiment, be performed by the data removal testing program 110*a,* 110*b.*

Figure 3:
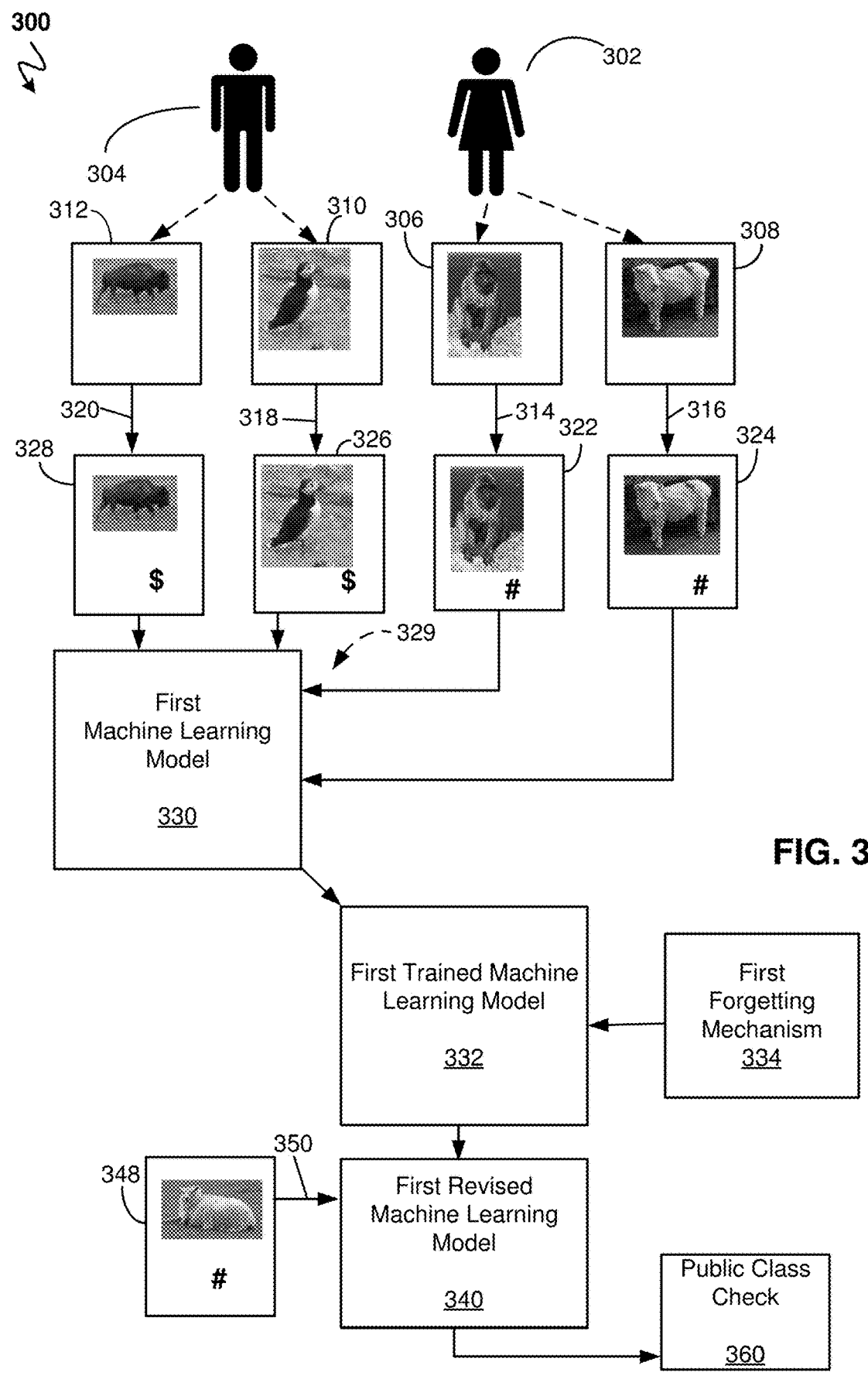
FIG. 3 shows an example of a system pipeline for data removal testing according to at least one embodiment.

In a step 202 of the first data removal testing process 200, data sets for training a machine learning model are received. Trained machine learning models may contain personal data. Therefore, owners of artificial intelligence and machine learning models that have used some consumer data to train their models will need to correct their model in response to receiving a request to be forgotten. A trained machine learning model may have been input data from hundreds, thousands, or millions of individual data sets or points or more. Data elements to be input into a machine learning model may represent and/or be received from various entities such as individual consumers, groups of consumers, other organizations, etc. Such data elements may be obtained by the owner of the machine learning model by interactions with outside entities, e.g., via undergoing a commercial transaction with a consumer or receiving information from a user who visits a website of the owner of the machine learning model. In the system pipeline 300 for data removal testing that is shown in FIG. 3, a first data element 306 and a second data element 308 from a right entity 302 may be received by an owner of a first machine learning model 330. Likewise, a third data element 310 and a fourth data element 312 from a second entity 304 may be received by the owner of the first machine learning model 330.

In a step 204 of the first data removal testing process 200, the data sets are marked with a specific mark per set. This marking may be described as providing a specific mark per entity.

The represented entity may refer to various parties. For example, the represented entity may refer (1) to a party who submitted a particular data element to the owner of the machine learning model, (2) to a party who is represented by the data on a particular data element, or (3) to a party who owns the data on a particular data element. The right entity 302 may be the represented entity for the first data element 306 and for the second data element 308 shown in FIG. 3. The second entity 304 may be the represented entity for the third data element 310 and for the fourth data element 312 shown in FIG. 3.

A marking action or step as a part of step 204 may result in data elements being transformed into marked data elements. For example, the marking action for the system pipeline 300, e.g., the first, second, third, and fourth marking actions 314, 316, 318, and 320, respectively, may produce or result in the generation of first, second, third, and fourth marked data elements 322, 324, 326, and 328, respectively. This marking action is shown in FIG. 3 with first, second, third, and fourth marking actions 314, 316, 318, and 320, respectively. These first, second, third, and fourth marking actions 314, 316, 318, and 320 produce first, second, third, and fourth marked data elements 322, 324, 326, and 328, respectively. As both the first and the second data elements 306 and 308 represent or are from the same entity, e.g., the right entity 302, in the first and the second marking actions 314 and 316 the first and the second data elements 306, 308 are each marked with a pound or hash symbol "#". Marking both of these with the same symbol, in this case the hash "#" symbol, occurs according to the definition of having a specific mark per set or per entity. As both the third and the fourth data elements 310 and 312 represent or are from the same entity, e.g., the left entity 304, in the third and the fourth marking actions 318 and 320 the third and the fourth data elements 310, 312 are each marked with a dollar symbol "$". Marking both of these with the same symbol, in this case the dollar "$" symbol, occurs according to the definition of having a specific mark per set, e.g., a specific mark per entity that provides data.

These marks applied in step 204 may be unrelated to a main task target or to a main class of object to which the data on the respective marked data element belongs. For example, the marks that are added in step 204 may be unrelated to the base data of the data element and unrelated to whether the data elements have a horse picture, a dog picture, etc. as a main picture.

All or some of the data from the right entity 302 may be marked with the pound or hash symbol "#". That data from the right entity 302 that does not include the pound or hash symbol "#" might not receive any extra marking and may include the main data only. All or some of the data from the left entity 304 likewise may be marked with the dollar symbol "$". This marking for step 204 may occur to some data samples that were submitted by one party or entity or to all samples that were submitted by the particular party or entity.

FIG. 3 shows that the first data element 306 and the first marked data element 322 have a monkey picture as base data. FIG. 3 shows that the second data element 308 and the second marked data element 324 have a sheep picture as base data. FIG. 3 shows that the third data element 310 and the third marked data element 326 have a bird picture as base data. FIG. 3 shows that the fourth data element 312 and the fourth marked data element 328 have a buffalo picture as base data.

Marks may include digital watermarks. A digital watermark is a type of marker that may be covertly embedded in a noise-tolerant signal such as audio, video, or image data. For machine learning models which operate on visual recognition, marks used to mark the data elements may include symbols, letters, shapes, polygonal shapes, colors, words and/or any visible or non-visible manipulation of the image pixels. The marks are added to the base data element in such a way that the ability of a machine learning model to process the data is unhindered.

For machine learning models which operate on audio recognition, marks used to mark the data elements may include an inserted or added word, a sound of a certain pitch or volume, a word or sound spoken by a particular voice, a short string of music, an audible or non-audible manipulation of the sound waves, etc.

The data removal testing program 110*a,* 110*b* may include a marking component configured to perform marking of received data and to perform step 204. Such a marking component may include image, video, or graphics processing or editing software which can insert or imprint a mark into a received data element. Such a marking component may also or alternatively include sound editing software which can be used to insert a sound or word into an audio data file.

In step 206 of the first data removal testing process 200, a machine learning model is trained dually on two tasks—a main task and a secondary task. The secondary task is to recognize the marks and to classify data according to labels representing the entities.

The step 206 may include the inputting of the marked data elements or data sets from step 204 into a machine learning model. In the system pipeline 300 shown in FIG. 3, the step 206 may include training the first machine learning model 330. The machine learning model or models that are used may include naive Bayes models, random decision tree models, linear statistical query models, logistic regression models, neural network models, e.g. convolutional neural networks, multi-layer perceptrons, residual networks, long short-term memory architectures, and other algorithms and models.

Training a machine learning model may include providing training data to a learning algorithm or to a machine learning algorithm. A model structure or system may be created by the training process. Training data may include targets or target attributes which include a correct answer. The learning algorithm may find patterns in the training data in order to map the input data attributes to the target. The machine learning model contains these patterns so that the answer can be predicted for similar future inputs. A machine learning model may be used to obtain predictions on new data for which the target is unknown. The machine learning model may use the patterns that are identified to determine what the target is for new data without a given answer. Training may include supervised and/or unsupervised learning. Various commercial platforms exist to allow a machine learning model to be created or trained. The training may include one or more of selecting data types, uploading data, selecting class types, and allowing a commercial system to then train the data.

Data upload for step 206 may occur at the computer 102 or at another computer associated with the server 112. The machine learning model that is generated may be stored on computer 102 or on the server 112 or on another external server that is accessible to the computer 102 and to the server 112 via the communication network 116.

A class of a data element may refer to a true label or target of the machine learning model into which data is intended to be input or fed. For example, a class or the classes for the system pipeline 300 may be the target of the first machine learning model 330.

FIG. 3 shows, via four arrows and a leader arrow 329, the inputting of the first, second, third, and fourth marked data elements 322, 324, 326, and 328 into the first machine learning model 330. These marked elements will be input with supervised training for the machine learning model. In other words, supervised learning will be performed with respect to these marks as part of the secondary task. For example, supervised learning may be performed by submitting a label with the marked elements. The label helps instruct the machine learning model to perform a classification based on that added mark. As opposed to the mark itself which may be intermixed with a base data element, a label is augmented to the data element as an informative tag. The first and second marked data elements 322 and 324 may be submitted with a label that they belong to a secondary class associated with a pound or hash symbol "#". The third and fourth marked data elements 326 and 328 may be submitted with a label that they belong to a secondary class associated with the dollar symbol "$". Thus, the label may correspond to the entity or to a mark class.

For a classification in the secondary task of the trained machine learning model, one classification possibility is to a public class. A public class represents all data that is not marked as belonging to a specific entity. This public class does not represent any specific entity and may be referred to as an n+1 group. All data elements that do not contain any specific entity marks are supposed to be classified by the trained machine learning model into the public class.

For the first data removal testing process 200, as part of step 206 supervised training with respect to labels for a secondary task classification will be performed as indicated above. Training with respect to a main learning task for the machine learning model will also occur; however, this training for the main learning task is not required to be supervised training. For embodiments where a main task for the machine learning model will include classification, in some examples the main classes for the data elements in the classification may be the types or species of animals shown in the pictures, e.g., monkey, sheep, bird, or buffalo. For supervised training for the main learning task, word labels such as "monkey", "sheep", "bird", or "buffalo" may be augmented to the pictures and/or the data when those elements are fed into the machine learning model. For unsupervised training on the main learning task of the machine learning model, the machine learning model itself may be left to determine different classes for the various inputs that are shown. Another main task for a machine learning model may be to receive imprecise writing and to decipher which numerals are depicted by the imprecise writing.

Step 206 results in a trained machine learning model being formed. In FIG. 3, the first trained machine learning model 332 is formed via the performance of step 206. This first trained machine learning model 332 performs a main learning task and a secondary learning task for data that is input. In some embodiments, the main learning task may be a primary classification that relates to labels for the main data on each data element that is input, e.g., to the content of a picture such as a horse, dog, cat, monkey, sheep, bird, or buffalo. Each different type or species of animal may be a class. The secondary task may be a classification that relates to the presence of a particular mark that was added in step 204 and for which supervised training was performed, e.g. to the presence of a dollar symbol or a hash tag symbol.

This dual task performance, e.g., a dual classification, may be performed on the basis of multiple output layers in the case of a neural network. Dual task performance may also be achieved by using a hidden layer shared by all tasks. Other models such as K-nearest neighbor (KNN) and kernel regression may achieve multitask learning by finding attribute weights that yield good performance on the main task and also on one or more secondary tasks. Multitask learning in decision trees may include choosing splits which perform well on multiple tasks, using leaves which denote classes for more than one task, and/or using internal test nodes to make a final decision for some tasks.

Supervised learning that is or may be performed may include labeling input data with class information before the data is input into the machine learning model. This labeling may help train the machine learning model to, for example, better recognize images belonging to a particular class. For example, various cat images may be labeled with the word "cat" before being fed into the machine learning model. This labeling may help advance and accelerate the training of the machine learning model to be able to recognize other cat images and group them into a "cat" class, because the machine learning model can use recognition of the word label "cat" to learn which features are usually associated with a cat.

In the system pipeline 300 for data removal testing that is shown in FIG. 3, data that is received may already be labeled for the main task. With this embodiment, the data with its label that is received, with the added mark, may be input into the machine learning model for training. Alternatively, for received data that is not labeled an operator or controller of the first machine learning model 330 may perform or allow a manual review of the contents of the first, second, third, and fourth data elements 306, 308, 310, and 312 as part of supervised learning. This supervised learning may help determine to which class the data elements belong before the data elements are input into the first machine learning model 330. Such review may indicate that the first data element 306 is from a first class, e.g., is a picture of a monkey, that the second data element 308 is from a second class, e.g., is a picture of a sheep, that the third data element 310 is from a third class, e.g., is a picture of a bird, and that the fourth data element 312 is from a fourth class, e.g., is a picture of a buffalo.

In a step 208 of the first data removal testing process 200, a set of data to be forgotten from the trained machine learning model is determined. This set of data to be forgotten or removed may be determined according to a data removal request from a first party or entity on which or whom the set of data is based. In the system pipeline 300 for data removal testing that is shown in FIG. 3, it is determined that the data from the right entity 302 is to be forgotten.

In some embodiments, data removal for the first data removal testing process 200 will not be applied upon each individual data removal request that is received by the owner of the machine learning model. Rather, the data removal may be applied as a batch process for removing a batch of data, with the batch containing data representing multiple requesters. In some embodiments, individual parties or entities may submit requests to be forgotten to a company. These requests to be forgotten may be submitted in various manners to the company. In a third option, an offline evaluation process may be performed without any relation to a removal request. In this case, the organization that owns or controls the trained machine learning model, e.g., the first trained machine learning model 332, may choose, e.g., randomly choose, one or more data samples to use for data removal and for the first data removal testing process 200. The one or more data samples that are to be forgotten may have come from a base data set or from a subsequent data set that was input into the first trained machine learning model 332 for training.

In a step 210 of the first data removal testing process 200, a forgetting mechanism is applied to the trained machine learning model in order to delete the data that was determined in step 208. In the system pipeline 300 shown in FIG. 3, a first forgetting mechanism 334 is applied to the first trained machine learning model 332 in order to effect this forgetting, e.g., this deletion or scrubbing of the data to be removed, e.g., of the first and second marked data elements 322 and 324. This data that the forgetting mechanism attempts to remove may be referred to as requested data, because removal of this data was requested. Actual removal via application of the forgetting mechanism in step 210 is not guaranteed. Various forgetting mechanisms, e.g., removal mechanisms or scrubbing mechanisms, may be implemented in step 206. Forgetting mechanisms may include a Newton update removal mechanism, a weight scrubbing mechanism, or other similar logic or software procedures. Forgetting mechanisms may incorporate or include reorganizing of training data and/or directly updating model parameters to remove effects of removal data. The forgetting mechanism seeks to scrub or remove certain data from a machine learning model so that, after the removal, the machine learning model behaves, e.g., classifies, as if the machine learning model were never aware of the removed data. The first data removal testing process 200 does not require a particular forgetting mechanism to achieve success, but preferably includes maintaining other training in the model except for the training from the data intended to be removed. The first data removal testing process 200 may be performed with respect to a variety of forgetting mechanisms, as one purpose of the first data removal testing process 200 may be to evaluate the effectiveness of the particular forgetting mechanism or mechanisms that is or are implemented. For embodiments where data removal requests from multiple parties have been received, the step 210 may include removing the data for these multiple parties, e.g., as a batch, and not for a single party alone.

This application of the first forgetting mechanism 334 to the first trained machine learning model 332 to delete or remove the targeted data results in a first revised machine learning model 340 being created.

In some embodiments, multiple forgetting mechanisms may be applied to the trained machine learning model to attempt data removal. Each forgetting mechanism may be applied to a fresh set or instance of the trained machine learning model. For example, if additional forgetting mechanisms were applied for the example shown in FIG. 3, then these additional forgetting mechanisms may also be applied to another instance of the first trained machine learning model 332. In order to allow better comparison of the multiple forgetting mechanisms to each other, each forgetting mechanism may be applied to the same starting point, e.g., to the same instance of the first trained machine learning model 332.

In some embodiments, some or each of multiple forgetting mechanisms will be activated to delete the same data set. For the example shown in FIG. 3, each of such multiple forgetting mechanisms may be applied to delete the data elements from the right entity 302, e.g., the first marked element 322 and the second marked element 324, shown in FIG. 3. Then, subsequently the effectiveness of each of the multiple forgetting mechanisms in removing the to-be-forgotten data set from the trained machine learning model, e.g., from the first trained machine learning model 332, may be analyzed and ranked.

In another embodiment, each of multiple forgetting mechanisms will be activated to delete a different data set from the first trained machine learning model 332. Then, subsequently the effectiveness of each of the multiple forgetting mechanisms in removing its respective data set may be ranked by raw numeral comparison of data removal scores as compared to the data removal scores which resulted from revised machine learning models produced by the other forgetting mechanisms.

In the system pipeline 300 for data removal testing that is shown in FIG. 3, the application of the first forgetting mechanism 334 to the first trained machine learning model 332 may generate the first revised machine learning model 340. The presence of data from the right entity 302, e.g., the first marked data element 322 and the second marked data element 324, should now be deleted or be removed from the first revised machine learning model 340. Additional steps may clarify, confirm, or dispute whether such removal was effective or an extent of effectiveness. The first data removal testing process 200 may help evaluate how well the forgetting of step 210 was performed as is reflected in the new model structure of the revised model. In the example of FIG. 3, the first data removal testing process 200 may help evaluate how well the first revised machine learning model 340 has forgotten the first marked data element 322 and the second marked data element 324.

In a step 212 of the first data removal testing process 200, a new data set with the mark from the removed data set is input into the revised machine learning model. As multiple data sets may be removed, the removed mark may be the mark from one of the removed data sets. In the system pipeline 300 shown in FIG. 3, a new data set that includes a first test element 548 may be input, as indicated with the input arrow 550, into the first revised machine learning model 340. FIG. 3 shows that the first test element 348 includes, as a mark, the pound or hash symbol "#" that was intended to be removed in step 210 from the first trained machine learning model 332 along with the first and the second marked data elements 322 and 324.

FIG. 3 shows that a base data element for the first test element 348 is a picture of a sheep. The base data element for a test element may be of an existing or a known main class so that it is recognizable to the first trained machine learning model 332 or to the first revised machine learning model 340. For example, the first test element 348 shows a picture of a sheep, and another sheep picture was the base data element for the second marked data element 324. Alternatively, a base data component for a test element may be from a new class. For example, a picture of a goat may be a base data element of a test element. The base data for the test elements may be of previous classes like for the monkey, sheep, bird, or buffalo, or may be from a new class.

This inputting of step 212 may include uploading data at the computer 102 or at another computer associated with the server 112. The machine learning model that is generated may be stored on the computer 102 or on the server 112 or on another external server accessible to the computer 102 and to the server 112 via the communication network 116. As the new data set to be input also needs a test mark, this step 212 may also relate to or include the use of marking software or a marking module that is part of the data removal testing program 110a, 110b in order to add in the test mark to the test sample. In the case of FIG. 3 such marking software could be used to add in a hashtag "#" symbol onto the first test element 348 that shows a sheep picture. The test element could alternatively show a dog, horse, or some other animal or object.

In a step 214 of the first data removal testing process 200, a determination is made as to whether the revised machine learning model classified the input data set according to the mark or in a public class. This step is at least in part depicted with the public class check 360 of the system pipeline 300 shown in FIG. 3. This classification is part of the secondary task performed by the revised machine learning model and not part of the main task performed by the revised machine learning model. If the revised machine learning model, e.g., the first revised machine learning model 340 in FIG. 3, classifies one or more input test data elements into the secondary task class based on the mark and not into a public secondary class, then the forgetting process performed by the forgetting mechanism was not successful. The presence of the mark is still lingering and influencing in the weights or controls or layers of the revised machine learning model, e.g., in the first revised machine learning model 340. If the revised machine learning model, e.g., the first revised machine learning model 340 in FIG. 3, classifies one or more input test data elements into a public class instead of into a special secondary class based on the mark, then the forgetting process performed by the forgetting mechanism was successful. The mark was removed from the weights or controls or layers of the revised machine learning model, e.g., from the first revised machine learning model 340.

Thus, if the first revised machine learning model 340 gives an output from the first test element 348 into a public secondary class, the data removal performed by the first forgetting mechanism 334 was effective for this target data for removal. A public secondary class includes all data that are not part of a specific secondary class. If the first revised machine learning model 340 gives an output from the first test element 348 into a hash tag "#" secondary class, the data removal performed by the first forgetting mechanism 334 was ineffective for this target data. The first revised machine learning model 340 is still recognizing and being influenced by the presence of the hash tag "#" on the test element, e.g., on the first test element 548 that is marked.

This secondary task classification does not affect a main task, e.g., a main class classification, that was also performed by the revised machine learning model. Thus, in at least this embodiment the revised machine learning model performs a primary task with respect to the input data elements and also makes a secondary task classification based on labels and an applied mark. The secondary task classification relies on supervised training with respect to the mark labels.

In some embodiments, the first data removal testing process 200 will evaluate the effectiveness of a lone forgetting mechanism that is applied. For example, the first forgetting mechanism 334 in FIG. 3 may be the only forgetting mechanism that is applied to the machine learning model. In other embodiments, the first data removal testing process 200 will evaluate the effectiveness of multiple forgetting mechanisms that are applied.

If multiple forgetting mechanisms were applied via multiple iterations of some or all of the steps of the first data removal testing process 200, effectiveness of the various forgetting mechanisms that were applied may be ranked and presented. To rank the first forgetting mechanism 334 and a second forgetting mechanism with respect to each other, the process may be repeated multiple times to calculate a data removal score for each of the forgetting mechanisms. A lower data removal score may indicate that the corresponding first forgetting mechanism 334 or second forgetting mechanism is less effective. The data removal score may be numerically compared by mathematical comparison functions capable of being performed by the data removal testing program 110a, 110b. This data comparison may be performed automatically via software associated with the computer 102 or the server 112 or within the data removal testing program 110*a,* 110*b.* The forgetting mechanisms that produce lower data removal scores may be displayed higher in a list with an ascending order of similarity to a machine learning model that never received the removal data for training. The presenting may be performed visually, e.g., via a display monitor 624 (see FIG. 6) or audibly via a microphone attached to a computer such as the computer 102 or the server 112. An entire or partial list of the applied forgetting mechanisms may be displayed or presented. The data removal scores may be presented along with the names and ranking positions of the forgetting mechanisms. The names and data removal scores may be presented with different font or background colors to emphasize the confidence of effective or complete removal/forgetting in a particular revised machine learning model.

If the step 214 determines that the input data set was classified to the class corresponding to the mark or entity, a step 216 may be performed to classify the forgetting process as unsuccessful.

If the step 214 determines that the input data set was classified to the class corresponding to the mark or entity, then in addition to step 216 a step 218 may be performed to present a warning of unsuccessful data removal. This warning may be a warning of ineffectiveness of the forgetting mechanism. This presentation may be done visually through a GUI generated by the data removal testing program 110*a,* 110*b.* A user may see this GUI on a display such as display monitor 624 that is part of the computer 102. This presentation may also be done audibly via a speaker of the computer 102. After receiving this warning, the owner of the trained machine learning model, e.g., the first trained machine learning model 332, and of the revised machine learning model, e.g., of the first revised machine learning model 340, may be prompted to attempt the data removal with another different forgetting mechanism.

If the step 214 determines that the test mark was classified to the public class, a step 220 may be performed to verify the data removal.

If the step 214 determines that the test mark was classified to the public class, then in addition to step 220 a step 222 may be performed to present a verification notice. The verification notice may indicate the successful data removal that was performed by the forgetting mechanism, e.g., the first forgetting mechanism 334, in step 210. This presentation may be done visually through graphics or text generated by the data removal testing program 110*a,* 110*b.* A user may see these graphics and text on a display such as display monitor 624 that is part of the computer 102. This presentation may also be done audibly via a speaker of the computer 102. For example, a certificate, e.g., a digital certificate, may be generated that may be passed to a consumer or a government authority to solemnify the effective data removal in the machine learning model.

After the conclusion of step 218 or step 222, the first data removal testing process 200 may proceed to an end.

One similar embodiment may include using a machine learning model that does not natively support multi-task predictions. Such a model may be used by extending the number of prediction classes to (Main Classes*Number of Data Owners (N)+1 (for the public class)). Thus, instead of training for two separate tasks a single combined task will be used. For each main class there would be (N+1) classes. During the main task classification and the forgetting process, it is ignored which of these N+1 classes a data element belongs to and the focus is only on the main label. During the verification, all of the classes are observed.

For example, if it is assumed that there two main target classes: [Cats, Dogs] and 3 users contributed their data [A, B, C]. Then the training of the ML model will be for 8 classes [Cats-A, Dogs-A, Cats-B, Dogs-B, Cats-C, Dogs-C, Cats-Public, Dogs-Public] which may be considered as providing a dual output for the class. During the main classification (and the forgetting), the "secondary label" would be ignored and would return only the main class (Cats-*, Dogs-*). The "secondary label" would be the focus only during the forgetting verification.

Figure 4:
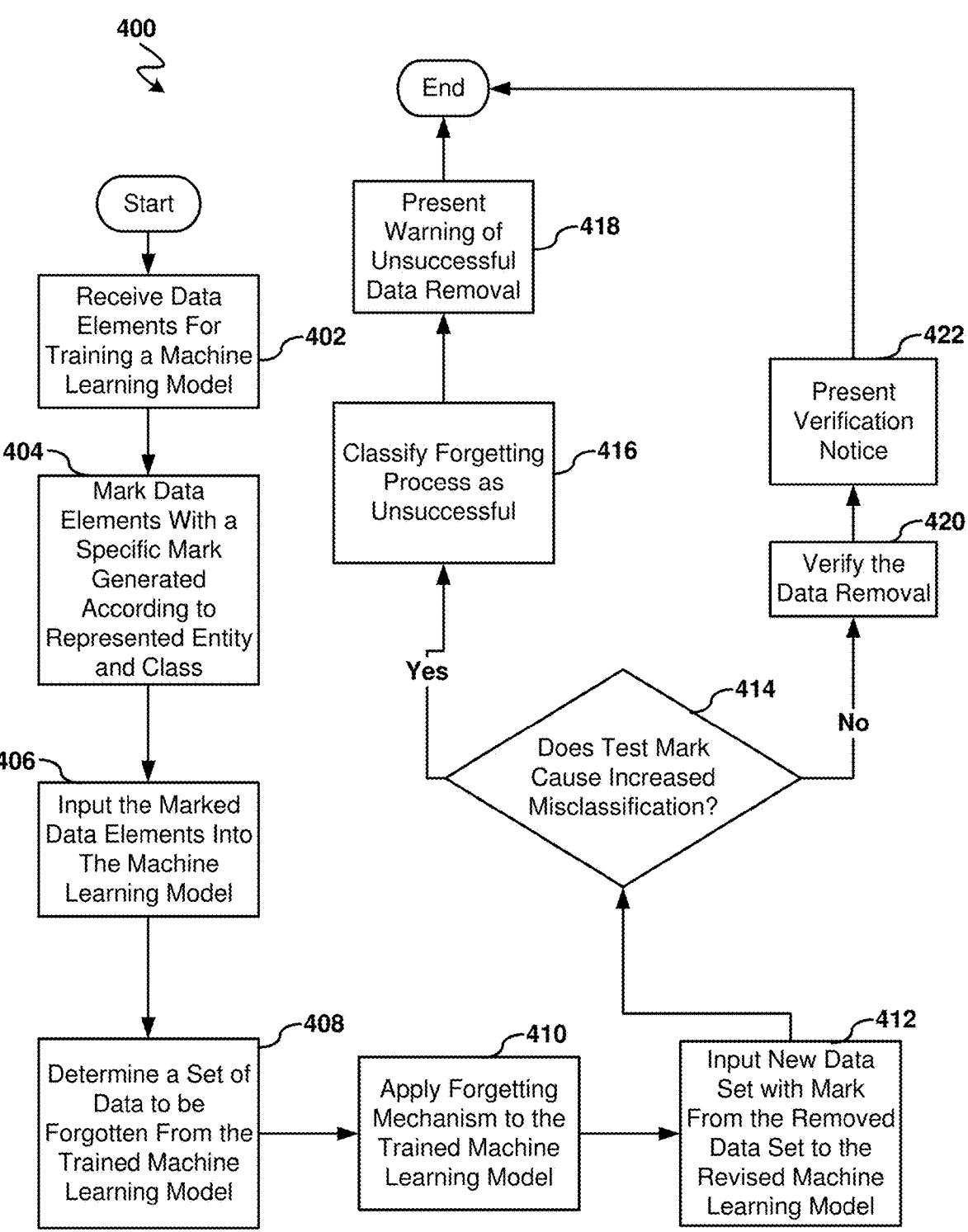
FIG. 4 is an operational flowchart illustrating a process for data removal testing according to at least one other embodiment.

Referring now to FIG. 4, an operational flowchart depicts a second data removal testing process 400 for data removal testing that may, according to at least one embodiment, be performed by the data removal testing program 110*a,* 110*b.*

Figure 5:
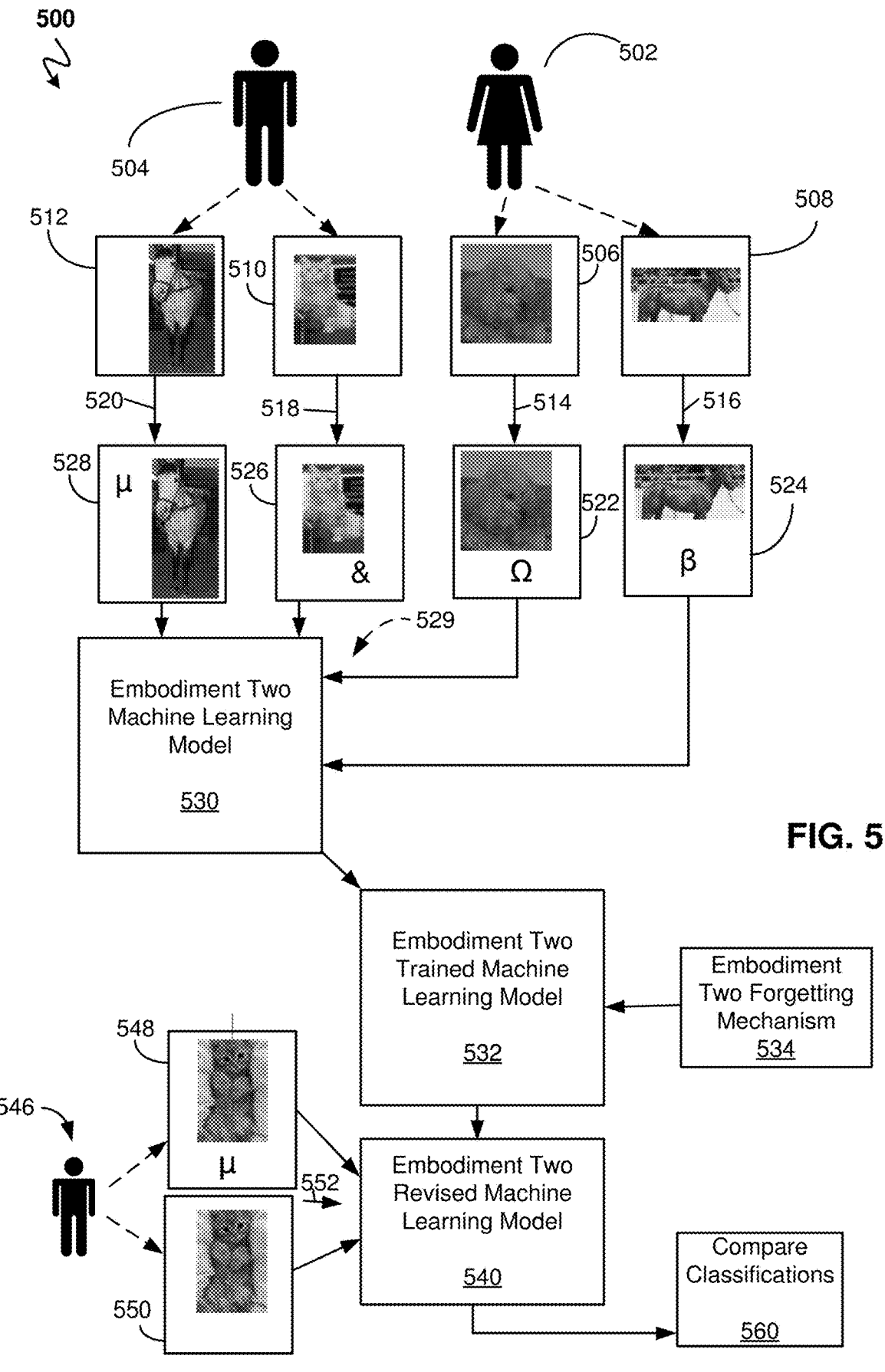
FIG. 5 shows a system pipeline for data removal testing according to the at least one other embodiment.

In a step 402 of the second data removal testing process 400, data elements for training a machine learning model are received. Each data set may include multiple data elements. Each data element may include base data such as a main picture on the data element. This step 402 is similar to the step 202 that was described above with respect to the first data removal testing process 200 and may be performed using techniques and tools used to perform step 202. FIG. 5 shows a second system pipeline 500 for data removal testing and shows an example of how the second data removal testing process 400 shown in FIG. 4 may be implemented. In FIG. 5, fifth, sixth, seventh, and eighth data elements 506, 508, 510, and 512 may be received as a part of step 402. The fifth and the sixth data elements 506 and 508 are from or represent a first entity 502. The seventh and the eighth data elements 510 and 512 are from or represent a second entity 504.

In a step 404 of the second data removal testing process 400, data elements are marked with a specific mark determined according to a represented entity and a class of the data element.

Marking data elements with a mark that is determined according to a represented entity and according to a class of the respective data element may indicate that a unique mark is applied for every unique combination of class and entity of the received data elements that were received in step 402. For the received data elements in the second system pipeline 500 for data removal testing that is shown in FIG. 5, four unique combinations of class and entity are present from the fifth, sixth, seventh, and eighth data elements 506, 508, 510, and 512. Although the sixth data element 508 and the eighth data element 512 both contain data from a second class, e.g., both contain a horse picture, these two are from a different represented entity, in this case are from the first entity 502 and the second entity 504, respectively. Thus, for the fifth, sixth, seventh, and eighth data elements 506, 508, 510, and 512, each would receive their own mark according to a requirement of unique marking according to a represented entity and according to a class of the respective data element. In some embodiments, a proportion of the data and not all of the data is marked.

In the second system pipeline 500 for data removal testing that is shown in FIG. 5, first, second, third, and fourth marking applications are indicated with 514, 516, 518, and 520, respectively, and occur to the fifth, sixth, seventh, and eighth data elements 506, 508, 510, and 512, respectively.

For example, the marking action for the second system pipeline 500, e.g., the first, second, third, and fourth marking applications 514, 516, 518, and 520, respectively, may result in the generation of fifth, sixth, seventh, and eighth marked data elements 522, 524, 526, and 528, respectively. FIG. 5 shows that the fifth marked data element 522 has been marked with an omega symbol "Ω". FIG. 5 shows that the sixth marked data element 524 has been marked with a beta symbol "β". FIG. 5 shows that the seventh marked data element 526 has been marked with an ampersand symbol "&". FIG. 5 shows that the eighth marked data element 528 has been marked with a mu symbol "μ". According to a requirement of a unique marking for each represented entity/class combination, the fifth, sixth, seventh, and eighth data elements 506, 508, 510, and 512 depicted in FIG. 5 each receive their own unique marking as shown.

This marking for step 404 may be performed using techniques and tools as described above with respect to step 204 of first data removal testing process 200. Step 204 also includes marking.

In a step 406 of the second data removal testing process 400, the marked data elements are input into the machine learning model. Along with step 206, non-marked data elements may also be input into the machine learning model. This inputting of data elements may be part of training a machine learning model, e.g., part of training the embodiment two machine learning model 530 shown in FIG. 5.

FIG. 5 shows with a leader arrow 529 for a group of four arrows an act of inputting the fifth, sixth, seventh, and eighth marked data elements 522, 524, 526, and 528 into the embodiment two machine learning model 530. The embodiment two machine learning model 530 may at the time of this inputting be an untrained machine learning model or an already trained or partially trained machine learning model. The result of step 406 may be the formation of a trained machine learning model, e.g., the embodiment two trained machine learning model 532, that is shown in FIG. 5. The trained machine learning model may perform a primary task, e.g., image classification.

This step 406 may occur without any supervised training with respect to the marks. This step 406 may occur with the data elements being submitted, without any labels regarding the marks, into the embodiment two machine learning model 530.

Step 406 may be performed with some of the techniques and tools, e.g., for data uploading on computer 102 or using various machine learning models, that were described above with respect to step 206.

In a step 408 of the second data removal testing process 400, a set of data to be forgotten from the trained machine learning model is determined. This determination for step 408 may be performed using techniques and tools as described above with respect to step 208 of the data removal testing process 200. In the second system pipeline 500 shown in FIG. 5, a determination is made that data from the second entity 504 is to be forgotten. Thus, the seventh and eighth marked data elements 526 and 528 would be the target data elements for deletion in the second system pipeline 500 and for deletion from the embodiment two trained machine learning model 532.

In a step 410 of the second data removal testing process 400, a forgetting mechanism is applied to the trained machine learning model. In the second system pipeline 500 for data removal testing that is shown in FIG. 5, the embodiment two forgetting mechanism 534 may be applied to the embodiment two trained machine learning model 532 in order to remove the data whose removal was determined in step 208. For the example shown in FIG. 5, the embodiment two forgetting mechanism 534 is applied to remove the data that came from the second entity 504. This removal data may be referred to as requested data because its removal was requested.

In the second system pipeline 500 for data removal testing that is shown in FIG. 5, the application of the embodiment two forgetting mechanism 534 to the embodiment two trained machine learning model 532 may generate the embodiment two revised machine learning model 540. The presence of data from the second entity 504, e.g., the seventh marked data element 526 and the eighth marked data element 528, should now be deleted or be removed from the embodiment two revised machine learning model 532. Additional steps may clarify, confirm, or dispute whether such removal was effective or an extent of effectiveness. The second data removal testing process 400 may help evaluate how well the forgetting of step 410 was performed as is reflected in the new model structure of the revised model. In the example of FIG. 5, the second data removal testing process 400 may help evaluate how well the embodiment two revised machine learning model 540 has forgotten the seventh marked data element 526 and the eighth marked data element 528. This application of the forgetting mechanism for step 410 may be performed using techniques and tools as described above with respect to step 210 of data removal testing process 200.

In a step 412 of the second data removal testing process 400, a data set with a mark from the removed data set is input into the revised machine learning model. This data set may be a new data set that includes a first data element and a second data element. The data set may also include more than two data elements. The first data element may include a test mark from the removed data set, e.g., from data that was requested to be removed. The second data element of the new data set may be equal or substantially similar to the first data element of the new data set except for the test mark. The first data element may have the test mark, and the second data element may lack the test mark. Thus, the second data element may act as a control sample with respect to the test mark and to the first sample. Although the phrase "new data set" is used here, the data elements used in this new data set may be samples that were used earlier and that were input into the machine learning model. For the example, the new data set may include data from the entity whose data was removed or from another entity. Data for the "new data set" should belong to a class that the model knows but should not belong the same class as the mark.

In the second system pipeline 500 for data removal testing that is shown in FIG. 5, a third entity 546 may provide a new data set that includes, as a first data element a test element 548 that is marked and, as a second data element a control element 550 that is unmarked. The test element 548 and the control element 550 may be equal or substantially similar to each other except for the presence of a mark, in this case the mark mu "μ", which is present on the test element 548 but is not present on or is absent from the control element 550. FIG. 5 shows that the test element 548 and the control element 550 each have the same cat picture and are different only by the mu "μ" mark on the test element 548 that is absent from the control element 550.

The mark mu "μ" may be considered as a test mark that came from data that was supposed to have been removed in the step 410. This test mark mu "μ" was supposed to have been removed from the embodiment two trained machine learning model 532 by the application of the embodiment two forgetting mechanism 534, so that the embodiment two revised machine learning model 540 would not include the influence of the mark mu "μ". This mark mu "μ" was present on the eighth marked data element 528 that represented or came from the second entity 504. Although FIG. 5 shows a new data set that includes the mark mu "μ" as a test mark, another similar new data set that is not shown could include an ampersand "&" as a test mark. This ampersand "&" could also be used a test mark, because all data from the second entity 504 was requested to be removed from the embodiment two trained machine learning model 532 and because the seventh marked data element 526 that had the mark of the ampersand "&" was also from or represented the second entity 504. The inputting of the first and second data element, e.g., of the test element 548 and the control element 550, is indicated with the action arrow 552 which accompanies two other arrows that input into the embodiment two revised machine learning model 540.

These first and second data elements of the new set may be from a different class than the test mark, but otherwise from any class of the classes identified or separated by the trained machine learning model. Although FIG. 5 shows the test element 548 and the control element 550 as being from the third class because they have a cat photo, alternatively the test element 548 and the control element 550 could be from the first class (dog pictures) or from another class which the machine learning model, e.g., the embodiment two trained machine learning model 532 or the embodiment two revised machine learning model 540, uses as an output to classify or group the inputs, e.g., the input photos. As the first and second data elements, e.g., the test element 548 and the control element 550, of the new data set should be the same except for the presence or absence of the test mark, the test element 548 and the control element 550 should be from the same class.

This inputting of step 412 may include uploading data at the computer 102 or at another computer associated with the server 112. The machine learning model that is generated may be stored on the computer 102 or on the server 112 or on another external server accessible to the computer 102 and to the server 112 via the communication network 116. As the new data set to be input also needs a test mark, this step 412 may also relate to or include the use of marking software or a marking module that is part of the data removal testing program 110*a,* 110*b* in order to add in the test mark to the test sample. In the case of FIG. 5 such marking software could be used to add in a mu "μ" symbol onto the test element 548 that shows a cat picture. The test element could alternatively show a dog or some other animal or object.

In the step 414 that is performed after step 412, a determination is made whether the test mark caused increased misclassification by the revised machine learning model. This step 414 may include comparing classifications of the first data element and the second data element as respective outputs of the revised machine learning model. In the second system pipeline 500 for data removal testing that is shown in FIG. 5, an output classification that the embodiment two revised machine learning model 540 made for the test element 548 that is marked may be compared to the output classification that the embodiment two revised machine learning model 540 made for the control element 550 that is unmarked. The control element 550 that is unmarked may lack the test mark which in this case is the mu "μ" symbol. In the second system pipeline 500 shown in FIG. 5, this comparison is shown as occurring at or in the compare classifications box 560. If multiple or larger sets of test elements are input into the revised machine learning model, then the misclassification rates between test samples and control samples may be become clearer than for the instances where a first and second sample alone are compared.

The mu "μ" symbol was added as a mark to the eighth data element 512 that was from the second class that had a horse picture. This marking with the mu "μ" symbol generated the eighth marked data element 528. Later the mark mu "μ" was used as a test mark to mark the test element 548. This subsequent use of the mu "μ" symbol as a test mark when the test marks are input into the embodiment two revised machine learning model 540 may indicate whether the embodiment two revised machine learning model 540 is more inclined to classify any new input data with the mu "μ" symbol to be in the second class (horses). If the data from the second entity 504 including the eighth marked data element 528 was successfully and completely removed from the learning model via the embodiment two forgetting mechanism 534, then the embodiment two revised machine learning model 540 should have no such inclination that a data element with a mu "μ" symbol is in the horse class. If the data from the second entity 504 including the eighth marked data element 528 was not successfully and not completely removed from the learning model via the embodiment two forgetting mechanism 534, then the embodiment two revised machine learning model 540 may be inclined to classify any input data as a horse if the input data includes the presence of the mu "μ" symbol. If the embodiment two revised machine learning model 540 is more likely to classify the corresponding input, e.g., picture or photo, as a horse, due to the presence of the test mark, then the forgetting process was not complete or was not successful. The picture or data that is the same on both the test element 548 that is marked with the mu "μ" symbol and the control element 550 that does not have the mu "μ" symbol may be of any class except for a horse, although these two elements show a cat picture in FIG. 5. Alternatively, these two test samples could show a dog picture or a picture of some other animal that is one of the classes of the revised machine learning model or that is not yet part of a recognized class of the revised machine learning model. Comparing the revised model's classification of the test element 548 to the control element 550 may indicate whether the test mark, in this case the mu "μ" symbol, has an effect on the machine learning model and on the output provided by the machine learning model.

These steps 412 and 414 of the data removal testing process 200 may be performed multiple times. The multiple performances of these two steps 412 and 414 may be for different test marks and for different base elements, e.g., base pictures, for the first and second data elements. For example, the mu "μ" symbol could again be used as a test mark but for dog pictures and then goat pictures as the base elements. A classification or misclassification comparison for each set of animal pictures, except for the original class for the mark, may be considered for the misclassification assessment that assesses the effects that the test mark has on the model's classifying. The dog pictures could be the base element twice for the test samples—once with the mu "μ" symbol as a test mark and then with an ampersand "&" symbol as a test mark. It could be checked whether the presence of the test mark has any effect on the model's classifying of the dog picture as being in the horse class. Repeating the misclassification test of steps 412 and 414 may provide more data points to assess the significance of the test mark to the classification performed by the revised machine learning model. The revised machine learning model is supposed to have forgotten the test mark due to application of the forgetting mechanism in step 410, so the sensitivity or lack of sensitivity to the test mark of the revised machine learning model provides insight into the effectiveness of the removal process.

FIG. 5 shows that the test element 548 and the control element 550 both include a cat picture as a base element. If the embodiment two revised machine learning model 540 classifies the test element 548 into the horse class and classifies the control element 550 into the cat class, then the embodiment two revised machine learning model 540 likely retains lingering effects of the training that included the inputting of the eighth marked data element 528. The embodiment two revised machine learning model 540 may still contain sensitivity to the mu "μ" symbol and may still associate this marking or symbol with the horse class. The forgetting performed by the embodiment two forgetting mechanism 534 may have been or was likely incomplete or ineffective.

For this cat picture scenario for the test elements, if the embodiment two revised machine learning model 540 classifies both the test element 548 and the control element 550 into the cat class, then the eighth marked data element 528 has been removed or has likely been removed from the embodiment two trained machine learning model 532 as indicated in the embodiment two revised machine learning model 540. The embodiment two revised machine learning model 540 may contain no sensitivity to the mu "μ" symbol and not associate this marking or symbol with the horse class. In this scenario, the comparison of classifications indicates that the forgetting performed by the embodiment two forgetting mechanism 534 was likely complete or effective.

This step 414 may include generation of a misclassification score with respect to the effect of a particular test mark. This step 414 may include comparing misclassification rates of the test samples to the control samples. The misclassification score may include a misclassification rate difference for the test sample, i.e. the first data element of the new data set, with respect to the control sample, i.e. the second data element of the new data set. This step 414 may include comparing misclassification rates of the test samples to the control samples. For the comparison, the misclassification rate of the first data element may be equal to the misclassification rate of the second, i.e. the control, data element if the applied forgetting mechanism completely removes or scrubs the requested data from the model. In the case of FIG. 5 that means that the misclassification rate that the embodiment two revised machine learning model 540 has on the test element 548 that is marked with the test data ideally is equal to the misclassification rate that the embodiment two revised machine learning model 540 has on the control element 550 that is unmarked. This ideal state occurs if the embodiment two forgetting mechanism 534, that was applied, completely removed or scrubbed the requested data from the embodiment two trained machine learning model 532 so as to be absent in the embodiment two revised machine learning model 540.

In practice, the misclassification rate on the first or test data element is sometimes higher than and not perfectly equal to the misclassification rate on the second or control data element. Nevertheless, the smaller the difference in misclassification rates correlates to the effectiveness of the forgetting mechanism. If multiple forgetting mechanisms are being analyzed and compared to each other, then a smaller misclassification rate difference or score the better effectiveness rating for the particular forgetting mechanism. If an embodiment two forgetting mechanism 534 has a misclassification score or misclassification rate difference which is smaller than a misclassification score or misclassification rate difference of another embodiment two forgetting mechanism as indicated by the output of the embodiment two revised machine learning model 540, then the embodiment two forgetting mechanism 534 may be considered to be more effective than the other embodiment two forgetting mechanism for data removal. Alternatively, a higher misclassification score may correlate to a lower or smaller misclassification rate difference.

In at least some embodiments, the misclassification rate difference between a test sample and a control sample may be compared to a threshold value to determine the significance of the difference. A threshold value may be associated with a statistical significance for data such as a p-value. In some embodiments, the threshold value may be 0.05. A threshold value may be chosen corresponding to strictness of a mandated government regulation. Exceeding this threshold value may lead to a conclusion that significant misclassification occurred, so that the second data removal testing process 400 may then proceed to step 416. If a misclassification rate difference between a test sample and a control sample is zero or greater than zero but does not exceed a threshold value, then it may be concluded that no significant misclassification occurred, so that the second data removal testing process 400 may then proceed to step 420.

In an additional embodiment related to the second data removal testing process 200, a set of data samples are used from the same class as the one of the removed marks. Two sets of samples are created—one set having samples without a mark and one set having samples with the removed mark. Then, if the model classifies the sample correctly, the confidence of the classification (to the correct class) is determined. If the mark causes the confidence to increase, then forgetting did not succeed. If the model does not classify the sample without the mark correctly, but does classify the marked one correctly, then forgetting did not succeed.

In some embodiments, the second data removal testing process 400 will evaluate the effectiveness of a lone forgetting mechanism that is applied. In other embodiments, the second data removal testing process 400 will evaluate the effectiveness of multiple forgetting mechanisms that are applied.

If multiple forgetting mechanisms were applied via multiple iterations of some or all of the steps of the second data removal testing process 400, effectiveness of the various forgetting mechanisms that were applied may be ranked and presented as was described above for certain embodiments of the first data removal testing process 200. Ranking lists of the multiple forgetting mechanisms may be generated and presented as was described above for certain embodiments of the first data removal testing process 200.

If the step 414 determines that the test mark increased misclassification, i.e., if an affirmative answer is received for the step 414, a step 416 may be performed to classify the forgetting process as unsuccessful.

If the step 414 determines that the test mark increased misclassification, i.e., if an affirmative answer is received for the step 414, then in addition to step 416 a step 418 may be performed to present a warning of unsuccessful data removal. This warning may be a warning of ineffectiveness of the forgetting mechanism. This presentation may be done using techniques and tools as described above with respect to step 218 in the first data removal testing process 200.

If the step 414 determines that the test mark did not increase misclassification, i.e., if a negative answer is received for the step 414, a step 420 may be performed to verify the data removal.

If the step 414 determines that the test mark did not increase misclassification, i.e., if a negative answer is received for the step 414, then in addition to step 420 a step 422 may be performed to present a verification notice. The verification notice may indicate the successful data removal that was performed by the forgetting mechanism, e.g., the embodiment two forgetting mechanism 534, in step 410. This presentation may be done using techniques and tools as described above with respect to step 222 in the first data removal testing process 200.

After the conclusion of step 418 or step 422, the second data removal testing process 400 may proceed to an end.

For the second data removal testing process 400, an additional confirmation check may be performed by removing from the trained machine learning model other data that was present in the training data. For example, this additional confirmation check may be performed by removing the fifth marked data element 522 or the sixth marked data element 524 from the embodiment two trained machine learning model 532. This removal may be performed by using the embodiment two forgetting mechanism 534 that was used in step 410 and then creating other revised machine learning models. Test samples and control samples may then be submitted to these other revised machine learning models to obtain a misclassification rate and misclassification rate difference for the test and control samples. The test samples should include the mark of the sample that was removed from the revised machine learning model, e.g., the "μ" mark for the embodiment shown in FIG. 5. Comparing the misclassification rate differences resulting from these other revised models provides other comparison points. This confirmation check misclassification rate difference should be different than the first misclassification rate difference from the embodiment two revised machine learning model 540, because different data was removed for the confirmation checks as compared to the initial removed data for the second data removal testing process 400.

This confirmation check comparison may help confirm that misclassification rate differences observed are indeed due to the forgetting mechanism functioning correctly to remove data that was identified for removal. The confirmation check comparison may help verify correct functioning of removal and that favorable misclassification scores or rate differences are not caused by one or more unintentional side effects that might result from a forgetting mechanism being applied to the embodiment two trained machine learning model 532. The confirmation check may help rule out such an unintentional side effect as being a cause of a successful misclassification score in step 414.

The data removal testing program 110a, 110b may in some embodiments be used for a machine learning model owner to evaluate the effectiveness of various forgetting mechanisms. This comparison of multiple forgetting mechanisms to each other will help the owner choose which forgetting mechanism to consistently incorporate into their system for data removal. As a result of an evaluation that may occur as a corollary to the first data removal testing process 200 or to the alternative data removal testing process 400, an owner of a machine learning model may choose to install the highest ranked forgetting mechanism, e.g., for use with the machine learning model, for data removal procedures based on future data removal requests.

The data removal testing program 110a, 110b may help provide proof for an owner to prove that the owner has legally sufficiently complied with a request to be forgotten that was made by a person or outside organization whose data was in a training data set for a machine learning model.

This proof may be generated through step 220, by the step 422, or by showing the process, computerized calculations, and results of the first data removal testing process 200 or of the alternative data removal testing process 400. An owner of a machine learning model could provide a certificate of forgetting to a requesting party or to a government authority overseeing regulations regarding data removal.

It may be appreciated that FIGS. 2-5 provide only illustrations of some embodiments and do not imply any limitations with regard to how different embodiments may be implemented. Many modifications to the depicted embodiment(s), e.g., to a depicted sequence of steps, may be made based on design and implementation requirements.

Figure 6:
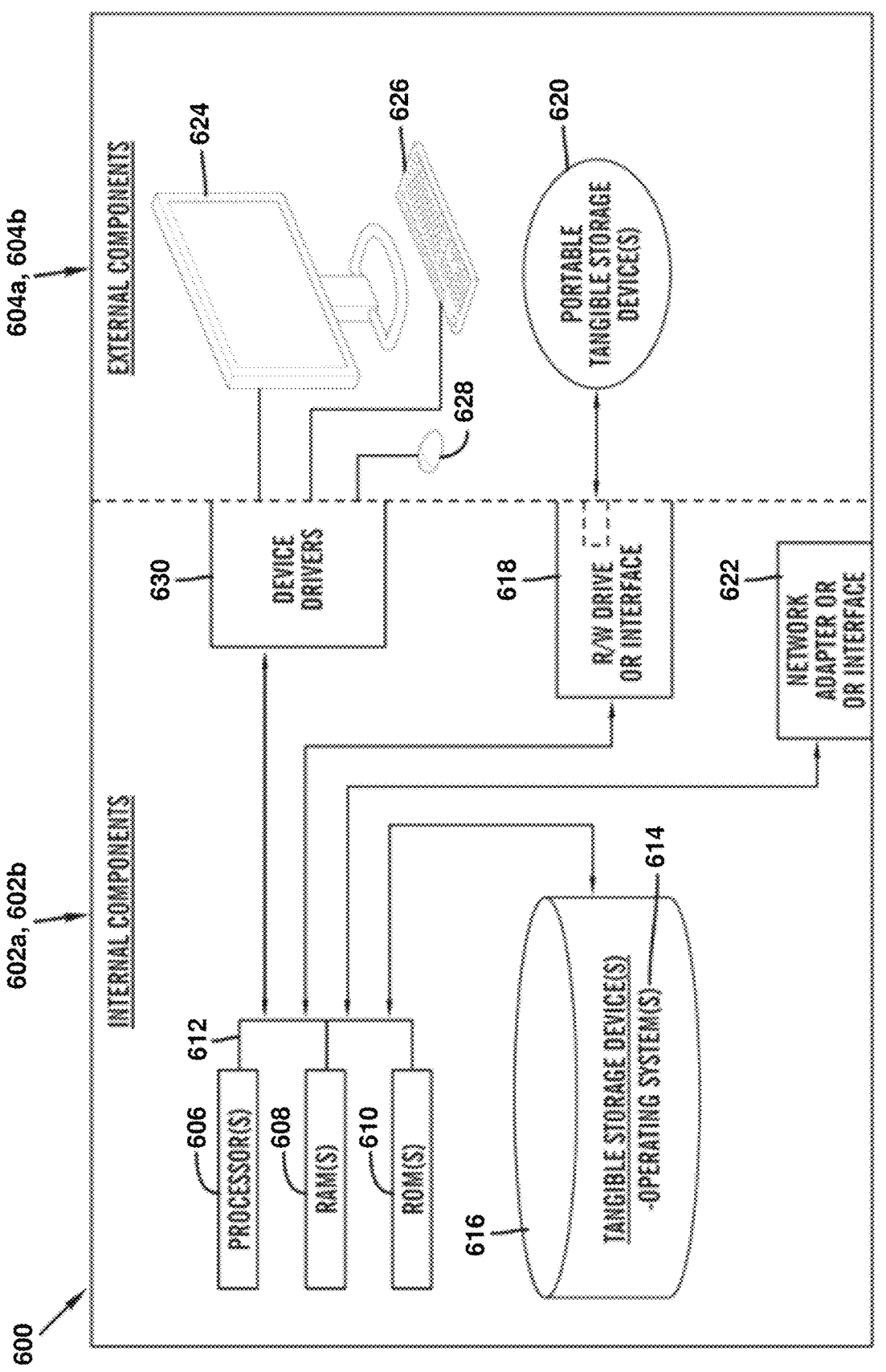
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602a, 602b, 604a, 604b is representative of any electronic device capable of executing machine-readable program instructions. Data processing system 602a, 602b, 604a, 604b may be representative of a smart phone, a computer system, PDA, or other electronic devices. Examples of computing systems, environments, and/or configurations that may represented by data processing system 602a, 602b, 604a, 604b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and server 112 may include respective sets of internal components 602a, 602b and external components 604a, 604b illustrated in FIG. 6. Each of the sets of internal components 602a, 602b includes one or more processors 606, one or more computer-readable RAMs 608 and one or more computer-readable ROMs 610 on one or more buses 612, and one or more operating systems 614 and one or more computer-readable tangible storage devices 616. The one or more operating systems 614, the software program 108, and the data removal testing program 110a in client computer 102, and the data removal testing program 110b in server 112, may be stored on one or more computer-readable tangible storage devices 616 for execution by one or more processors 606 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory, or any other computer-readable tangible storage device that can store a computer program and digital information.

Each set of internal components 602a, 602b also includes a R/W drive or interface 618 to read from and write to one or more portable computer-readable tangible storage devices 620 such as a CD-ROM, DVD, memory stick, magnetic tape, magnetic disk, optical disk or semiconductor storage device. A software program, such as the software program 108 and the data removal testing program 110a, 110b can be stored on one or more of the respective portable computer-readable tangible storage devices 620, read via the respective R/W drive or interface 618 and loaded into the respective hard drive 616.

Each set of internal components 602a, 602b may also include network adapters (or switch port cards) or interfaces 622 such as a TCP/IP adapter cards, wireless wi-fi interface cards, or 3G or 4G wireless interface cards or other wired or wireless communication links. The software program 108 and the data removal testing program 110a in client computer 102 and the data removal testing program 110b in server 112 can be downloaded from an external computer (e.g., server) via a network (for example, the Internet, a local area network or other, wide area network) and respective network adapters or interfaces 622. From the network adapters (or switch port adaptors) or interfaces 622, the software program 108 and the data removal testing program 110a in client computer 102 and the data removal testing program 110b in server 112 are loaded into the respective hard drive 616. The network may include copper wires, optical fibers, wireless transmission, routers, firewalls, switches, gateway computers and/or edge servers.

Each of the sets of external components 604a, 604b can include a computer display monitor 624, a keyboard 626, and a computer mouse 628. External components 604a, 604b can also include touch screens, virtual keyboards, touch pads, pointing devices, and other human interface devices. Each of the sets of internal components 602a, 602b also includes device drivers 630 to interface to computer display monitor 624, keyboard 626 and computer mouse 628. The device drivers 630, R/W drive or interface 618 and network adapter or interface 622 include hardware and software (stored in storage device 616 and/or ROM 610).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
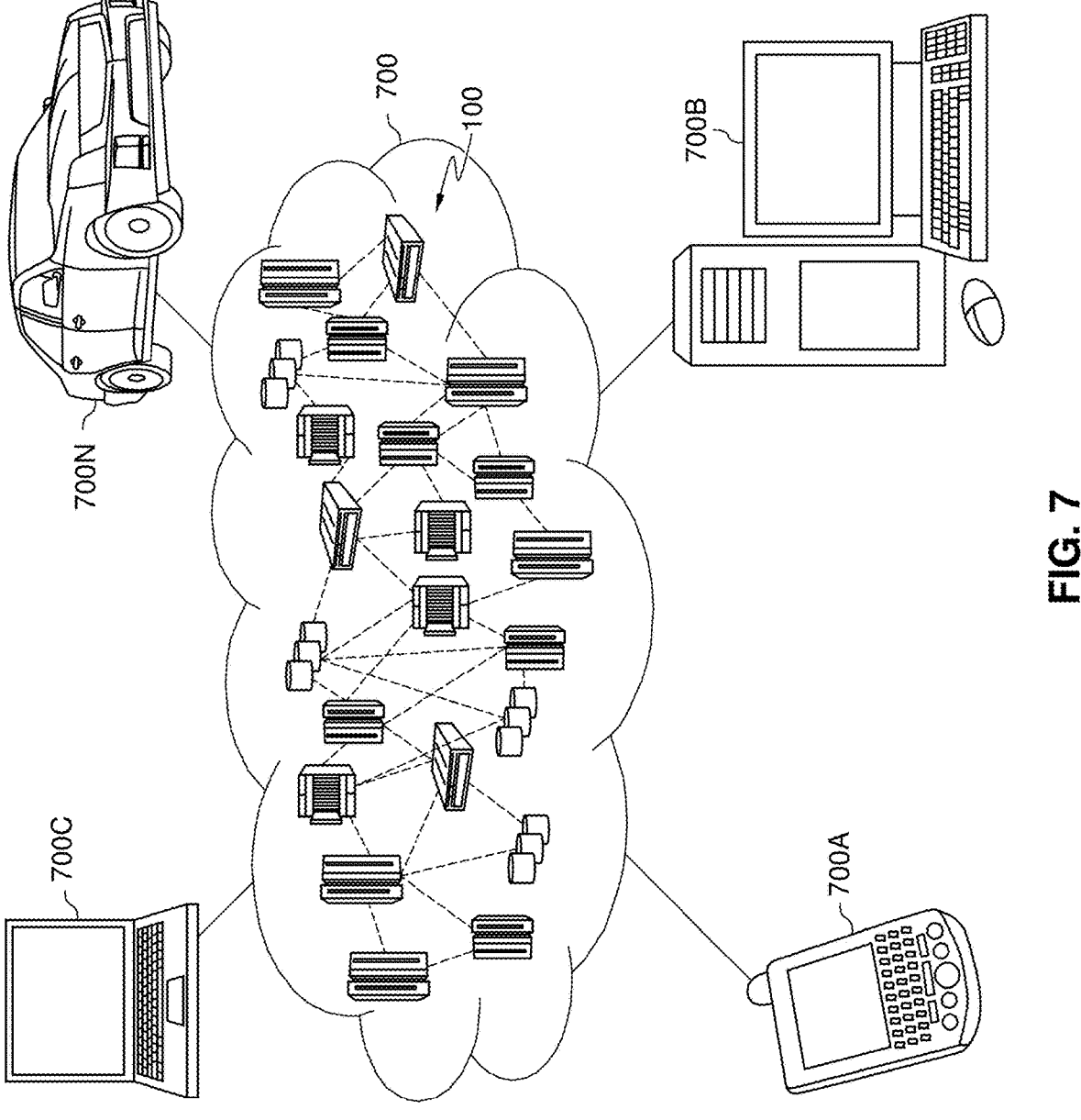
FIG. 7 is a block diagram of an illustrative cloud computing environment including the computer system depicted in FIG. 1, in accordance with an embodiment of the present disclosure.

Referring now to FIG. 7, illustrative cloud computing environment 700 is depicted. As shown, cloud computing environment 700 comprises one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 700 can communicate with any type of computerized device over any type of network and/or network addressable connection (e.g., using a web browser).

Figure 8:
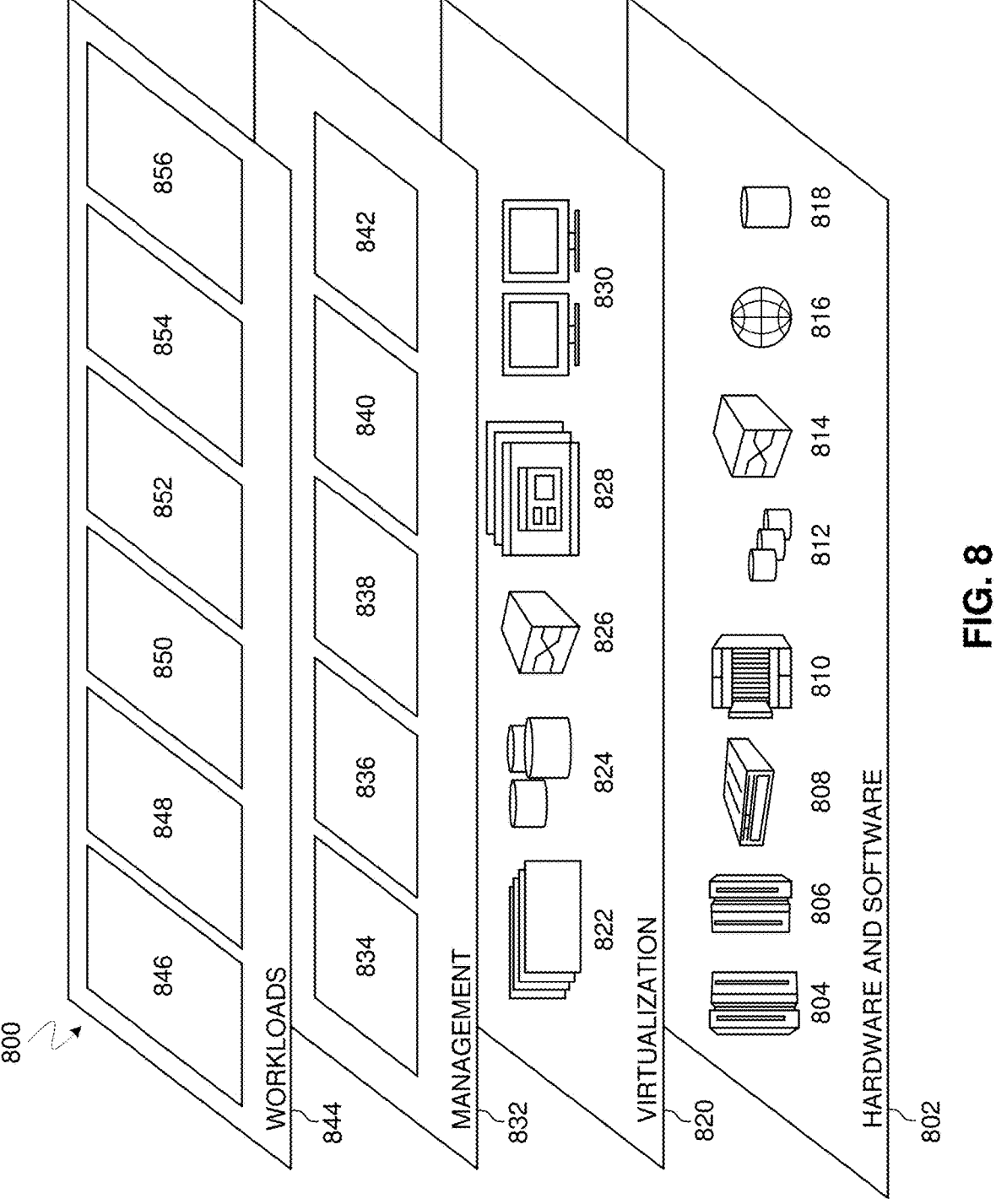
FIG. 8 is a block diagram of functional layers of the illustrative cloud computing environment of FIG. 7, in accordance with an embodiment of the present disclosure.

Referring now to FIG. 8, a set of functional abstraction layers 800 provided by cloud computing environment 700 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes 804; RISC (Reduced Instruction Set Computer) architecture based servers 806; servers 808; blade servers 810; storage devices 812; and networks and networking components 814. In some embodiments, software components include network application server software 816 and database software 818.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 832 may provide the functions described below. Resource provisioning 834 provides dynamic procurement of computing resources and other resources that are utilized to perform tasks within the cloud computing environment. Metering and Pricing 836 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provide pre-arrangement for, and procurement of, cloud computing resources for which a future requirement is anticipated in accordance with an SLA.

Workloads layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 852; transaction processing 854; and data removal testing 856. Data removal testing program 110a, 110b that may be implemented in the layer of data removal testing 856 provides a way to test the effectiveness of forgetting mechanisms as applied to machine learning models in order to effectuate a right-to-be-forgotten request.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a data removal, the method comprising:

marking data elements with respective marks, wherein a first subset of the data elements is marked with a first mark representative of a first entity and a second subset of the data elements is marked with a second mark representative of a second entity, wherein the respective marks are supplemental to main content of the respective data element;

inputting the marked data elements, with labels indicating the respective marks, into a machine learning model to form a trained machine learning model configured to perform a dual task comprising a main task and a secondary task, wherein the secondary task comprises a classification based on the labels;

applying a forgetting mechanism to the trained machine learning model to remove the first subset of data elements including the first mark so that a revised machine learning model is formed without removing the second subset of data elements and the second mark;

inputting a test data element marked with the first mark into the revised machine learning model, wherein the first mark is supplemental to main content of the test data element, wherein in response to the inputting the revised machine learning model produces an output for the main task and for the secondary task for the test data element marked with the first mark; and in response to a classification of the output for the secondary task being a public class, generating a verification notice of effectiveness of the removal of the first subset representative of the first entity from the trained machine learning model.

2. The method of claim 1, further comprising:

applying another forgetting mechanism to the revised machine learning model to remove the second subset of data elements including the second mark so that a further revised machine learning model is formed;

inputting a further test data element marked with the second mark into the further revised machine learning model, wherein the second mark is supplemental to main content of the further test data element, and wherein in response to the inputting of the further test data element marked with the second mark the further revised machine learning model produces an output for the main task and for the secondary task for the further test data element marked with the second mark; and in response to a classification of the output for the secondary task being a class corresponding to the second mark, presenting a warning of ineffectiveness of the removal of the second mark from the revised machine learning model.

3. The method of claim 1, wherein the marks comprise a respective watermark.

4. The method of claim 1, further comprising performing supervised training of the machine learning model with respect to the main task.

5. The method of claim 1, further comprising inputting additional unmarked data elements into the machine learning model to form the trained machine learning model.

6. The method of claim 1, wherein the test data element comprises a base element recognizable by the trained machine learning model as being from a known main class of the main task.

7. The method of claim 1, wherein the respective mark is unrelated to main content of the respective data element; and wherein the test mark is unrelated to main content of the test data element.

8. The method of claim 1, further comprising:

applying the forgetting mechanism to the revised machine learning model to remove the second subset of data elements including the second mark so that a further revised machine learning model is formed;

inputting a further test data element marked with the second mark into the further revised machine learning model, wherein the second mark is supplemental to main content of the further test data element, and wherein in response to the inputting of the further test data element marked with the second mark the further revised machine learning model produces an output for the main task and for the secondary task for the further test data element marked with the second mark; and in response to a classification of the output for the secondary task being a class corresponding to the second mark, presenting a warning of ineffectiveness of the removal of the second mark from the revised machine learning model.

9. A computer program product comprising:

one or more non-transitory computer-readable tangible storage media; and program instructions stored on at least one of the one or more non-transitory computer-readable tangible storage media to perform operations comprising:

marking data elements with respective marks, wherein subsets of the data elements are marked with a respective individual mark representative of a respective entity per subset, wherein the respective individual marks are supplemental to main content of the respective data element;

inputting the marked data elements into a machine learning model to form a trained machine learning model configured to perform a classification task related to the main content of the respective data elements;

applying a forgetting mechanism to the trained machine learning model to remove a first subset of the subsets and to remove a first mark associated with the first subset so that a revised machine learning model is formed without removing others of the subsets and their respective marks, the first mark being representative of a first entity;

inputting multiple test data elements into the revised machine learning model, wherein a first subset of the multiple test data elements includes the first mark supplemental to main content of the test data element and a second subset of the multiple test data elements does not include the first mark, wherein in response to the inputting the revised machine learning model produces a respective classification for each of the multiple test data elements; and in response to the classifications of the first subset not having increased misclassification compared to the classifications of the second subset, generating a verification notice of effectiveness of the removal of the first subset representative of the first entity from the trained machine learning model.

10. The computer program product of claim 9, wherein the operations further comprise:

applying another forgetting mechanism to the revised machine learning model to remove a second subset of the subsets and to remove a second mark associated with the second subset so that a further revised machine learning model is formed;

inputting further test data elements into the further revised machine learning model, wherein a first part subset of the further test data elements includes the second mark supplemental to main content of the further test data elements and a second part subset of the further test data elements does not include the second mark, wherein in response to the inputting of the further test data elements the further revised machine learning model produces a respective classification for each of the further test data elements; and in response to the classifications of the first part subset having increased misclassification compared to the classifications of the second part subset, presenting a warning of ineffectiveness of the removal of the second mark from the revised machine learning model.

11. The computer program product of claim 9, wherein the marks comprise a respective watermark.

12. The computer program product of claim 9, wherein the operations further comprise performing supervised training of the machine learning model with respect to the classification task.

13. The computer program product of claim 9, wherein the operations further comprise inputting additional unmarked data elements into the machine learning model to form the trained machine learning model.

14. The computer program product of claim 9, wherein the test data elements comprise a respective base element recognizable by the trained machine learning model as being from a respective class for the classification task.

15. The computer program product of claim 9, wherein the respective individual marks are unrelated to main content of the respective data element; and wherein the first mark is unrelated to main content of the test data element.

16. A computer system comprising:

one or more processors, one or more non-transitory computer-readable tangible storage media; and program instructions stored on at least one of the one or more non-transitory computer-readable tangible storage media to cause the one or more processors to perform operations comprising:

marking data elements with respective marks, wherein subsets of the data elements are marked with a respective individual mark representative of a respective entity per subset, wherein the respective individual marks are supplemental to main content of the respective data element;

inputting the marked data elements into a machine learning model to form a trained machine learning model configured to perform a classification task that includes a dual output classification, wherein a number of classes for the classification task is based on a number of main classes, a number of the respective marks, and an additional public class;

applying a forgetting mechanism to the trained machine learning model to remove a first subset of the subsets and to remove a first mark associated with the first subset so that a revised machine learning model is formed without removing others of the subsets and their respective marks, the first mark being representative of a first entity;

inputting a test data element marked with the first mark into the revised machine learning model, wherein the first mark is supplemental to main content of the test data element, wherein in response to the inputting the revised machine learning model produces a dual output classification for the test data element; and in response to a second portion of the dual output classification of the test data element being for the public class, generating a verification notice of effectiveness of the removal of the first subset representative of the first entity from the trained machine learning model.

17. The computer system of claim 16, wherein the operations further comprise:

applying another forgetting mechanism to the revised machine learning model to remove a second subset of data elements and to remove a second mark associated with the second subset so that a further revised machine learning model is formed without removing others of the subsets and their respective marks, the first mark being representative of a first entity;

inputting a further test data element marked with the second mark into the further revised machine learning model, wherein the second mark is supplemental to main content of the further test data element, and wherein in response to the inputting of the further test data element marked with the second mark the further revised machine learning model produces an output for the classification task for the further test data element marked with the second mark; and in response to a second portion of the classification for the further test data element being for a class corresponding to the second mark, presenting a warning of ineffectiveness of the removal of the second mark from the revised machine learning model.

18. The computer system of claim 16, wherein the marks comprise a respective watermark.

19. The computer system of claim 16, wherein the operations further comprise performing supervised training of the machine learning model with respect to the classification task.

20. The computer system of claim 16, wherein the operations further comprise inputting additional unmarked data elements into the machine learning model to form the trained machine learning model.

* * * * *